United States Patent [19]

Baer

[11] Patent Number: 5,070,933
[45] Date of Patent: Dec. 10, 1991

[54] TEMPERATURE REGULATING SYSTEM
[75] Inventor: Stephen C. Baer, Albuquerque, N. Mex.
[73] Assignee: Zomeworks Corporation, Albuquerque, N. Mex.
[21] Appl. No.: 644,165
[22] Filed: Jan. 22, 1991
[51] Int. Cl.$^5$ .............................................. F28D 15/00
[52] U.S. Cl. ....................................... 165/32; 165/56; 165/104.19; 165/904; 62/467
[58] Field of Search ...................... 165/32, 104.19, 56, 165/904; 62/467

[56] References Cited

U.S. PATENT DOCUMENTS

| | | | |
|---|---|---|---|
| 2,364,144 | 12/1944 | Hunsaker | 429/120 X |
| 2,626,971 | 1/1953 | Mansoff | 429/120 |
| 3,018,087 | 1/1962 | Steele | 165/904 |
| 3,110,633 | 11/1963 | Bachmann | 429/120 X |
| 3,563,305 | 2/1971 | Hay | 165/104.19 |
| 3,708,346 | 1/1973 | Nash | 429/62 |
| 3,735,806 | 5/1973 | Kirkpatrick | 165/32 |
| 3,834,945 | 9/1974 | Jensen | 429/120 |
| 4,007,315 | 2/1977 | Brinkmann | 429/62 |
| 4,095,938 | 6/1978 | Mikaila | 432/225 |
| 4,913,985 | 4/1990 | Baer | 429/50 |

Primary Examiner—Albert W. Davis, Jr.
Attorney, Agent, or Firm—Townsend and Townsend

[57] ABSTRACT

A temperature regulating system that includes an enclosure having at least one temperature regulator including a container coupled to the ceiling of the enclosure and having an upper wall, a lower wall and an intermediate section that form a chamber which houses insulation and is filled with water provides a cooling system independent of external power. The insulation is positioned adjacent to the upper wall of the container and includes an upper surface facing the container's upper wall. The area of the upper surface of the insulation is approximately equal to the effective heat transfer area of the interior surface of the container. The insulation forms passages that provide fluid flow communication between the upper and lower walls of the container. With this construction relatively cold water, chilled by cool surroundings, e.g., the night atmosphere, flows downwardly from the region adjacent to the upper wall of the container to below the insulation and toward the lower wall of the container, cools the interior space of the enclosure by heat transfer. Relatively warm water flows upwardly from the region adjacent to the lower wall of the container, above the insulation and toward the upper wall of the container. The thermal characteristics of the insulation and water minimize the penetration of heat from outside during the day.

30 Claims, 2 Drawing Sheets

TEMPERATURE REGULATING SYSTEM

BACKGROUND OF THE INVENTION

The present invention relates to a passive system for regulating temperature in an enclosure exposed to ambient temperature extremes, and in particular to a system which passively cools the interior of a structure exposed to extreme heat.

The interior spaces of structures exposed to extreme heat are typically cooled by active refrigeration (i.e., air conditioning) and evaporative cooling systems. Unfortunately, such systems demand a substantial amount of electric or another type of external power which generates substantial operating costs in addition to the initial cost of the system. Refrigeration systems use almost as much electrical energy as the energy they remove in cooling the interior space of a structure. Evaporative cooling systems also use substantial amounts of electrical energy to power fans and pumps, and require constant replenishment of their water supply.

The cost of active cooling systems is not always prohibitive in structures designed for human habitation or use, such as homes, office buildings, factories and the like. However, cooling systems are often desirable in other types of structures where the installation and operating costs of active cooling systems cannot by justified, such as relatively small or remote structures designed to house livestock or electrical or fiber-optic equipment. It is often not feasible to bring electricity to a remote structure or to provide for the generation of electricity on-site, or to provide an alternate source of power. As a result, active cooling systems often cannot be used in situations in which some form of temperature control is highly desirable.

In an attempt to avoid the deficiencies of active cooling systems in remote installations, certain systems have been developed which attempt to provide cooling by passively radiating heat to the night sky. Such systems typically employ a large thermal mass, such as a quantity of water, which absorbs heat during the day to minimize the increase in the temperature of the interior of the structure. At night, a form of thermal coupling is provided to the roof so that the heat content of the thermal mass is reduced by radiation from the roof to the night sky. During the day, of course, the thermal couple must thermally isolate the thermal mass from the roof so that the thermal mass is not directly heated by solar radiation. One such system is disclosed in U.S. Pat. No. 4,913,985, assigned to the assignee of this application.

The Achilles heel of existing passive cooling systems is the complex thermal coupling mechanism required between the thermal mass and the roof. The above-referenced patent discloses a system of hoses which rely on suction, effectively limiting the technique to relatively small structures. Other such systems rely on movable covers or other mechanisms such as fans which must be powered and which defeat the objective of a truly passive cooling system which operates without an external power source.

SUMMARY OF THE INVENTION

The present invention provides a temperature regulator for cooling a structure exposed to extreme heat, such as a desert environment. The regulator includes a container which has an inner chamber and an upper wall adapted to be in thermal contact with the underside of the roof of the structure. A supply of water fills the chamber and is in contact with essentially the entire effective heat transfer area of the upper wall of the chamber. Insulation is disposed in the chamber and is located adjacent the upper wall of the chamber. The insulation defines passages that allow the water to flow vertically through the insulation.

During the day, when the roof of the structure is heated by solar radiation, the container and its water mass provides a substantial barrier to the transfer of heat into the structure. The insulation performs its normal insulation function as a barrier to heat transfer. In addition, the thermal mass of the water absorbs heat, limiting the rise of the temperature of the interior of the structure. The side walls of the chamber are preferably constructed of plastic or other material which is a poor heat conductor to further minimize the transfer of heat to the interior of the structure.

At night, the radiation of heat from the roof into the night sky cools the water above the insulation so that it is cooler than the water below the insulation. Since warmer water (above 39 degrees Fahrenheit) tends to rise, the warmer water will circulate upwardly through the passages in the insulation so that the entire water mass is cooled by a combination of convection and radiation to the night sky. By limiting the rise of the internal temperature and trapping much of the heat in the water mass, and dissipating the heat from the water at night, relatively cool internal temperatures can be maintained inside the structure even in the most severe environment.

The system of the present invention will radiate heat at night because the water will flow through the system due to a cooling thermal siphon effect. The cooling thermal siphon effect is present when warm water is less dense than cold water (i.e., at temperatures above about 39° F.), and when the temperature of the water above the insulation is less than the temperature of the water below the insulation. Water circulation will not be significant during the day when the water above the insulation is heated by the sun.

The roof of the enclosure is preferably coated or constructed of a material which is emissive of infrared radiation to maximize black body radiation to the cold night sky. This allows the temperature of the water to be cooled to several degrees Fahrenheit below ambient temperature to enhance the cooling effect. The roof must be opaque to solar radiation so that the water mass is not heated directly by the sun. The insulation inside each temperature regulator, together with the low diffusivity of the water inhibits heat transfer from outside the enclosure.

While primarily designed to prevent overheating of the interior of the structure, the system of the present invention also prevents the interior of the structure from excessive cooling in low temperature environments. When the water in the regulator reaches its freezing point, further cooling is prevented as the water gives up its latent heat until the water has completely frozen. Cooling of whatever is present in the enclosure to below freezing temperature levels is thus effectively prevented in all but the most cold temperature environments. In most temperature environments, the temperature within the enclosure will be maintained by the system of the present invention between approximately 35° F. and 80° F.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
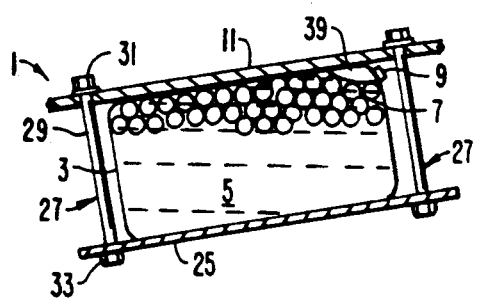
FIG. 1 is a sectional view of the temperature regulator in accordance with the principles of the present invention.

Referring to the drawings in detail, wherein like numerals indicate like elements, the temperature regulating system is illustrated in accordance with the principles of the invention.

As illustrated in FIG. 1, temperature regulator 1 comprises container 3, constructed using a material with a relatively low thermal conductivity and which is a poor conductor of heat, such as plastic. Container 3 houses water 5, the thermal mass of the regulator, and insulation suspended in the upper region of the container 1. The thermal mass absorbs and transfers heat from the system (discussed below). The insulation can be in the form of floating elements such as expanded polystyrene foam spheres (FIGS. 1 and 4), a floating single piece styrofoam slab (FIGS. 5-7), or a denser insulation medium fastened to the upper region of container 3 (not shown) such that a relatively small space is maintained between the insulation and the upper wall of the container. The buoyancy of the insulation illustrated in FIGS. 1, 4 and 5-7 provides a simple way in which the insulation is maintained in the upper region of container 3.

Returning to FIG. 1, the insulation is shown as comprising floating insulation elements or balls 7. Preferably these insulation elements are in the form of spheres, since it has been found that a spherical configuration permits the formation of a dense layer of insulation at the top of container 1, while providing the passageways necessary to allow the percolation of water through the insulation. In addition, the spherical beads only form point contacts with the upper wall of container 3, thereby providing a space between the insulation and the upper wall of the container occupied by a portion of the water. It has been found that optimum heat transfer results from the use of hollow plastic or foam spheres, wherein the spheres have a diameter of at least one inch. When the spheres have a diameter of less than one inch, the space between spheres in which fluid flow can take place is reduced to the extent that convective heat transfer, discussed below, is appreciably reduced.

Container 3 further includes inlet/outlet port 9 which permits container 3 to be filled with or drained of water 5. Port 9 also provides a way in which to introduce insulation elements 7 into container 3. Port 9 can be sealed as is conventionally known in the art, so that the water is retained in container 3.

Figure 2:
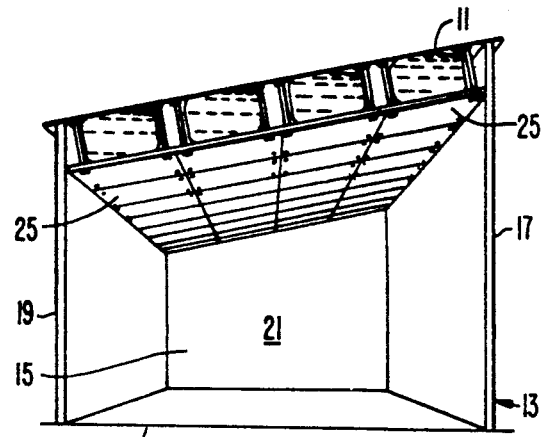
FIG. 2 is a sectional view of the temperature regulating system in accordance with the principles of the invention.
Figure 3:
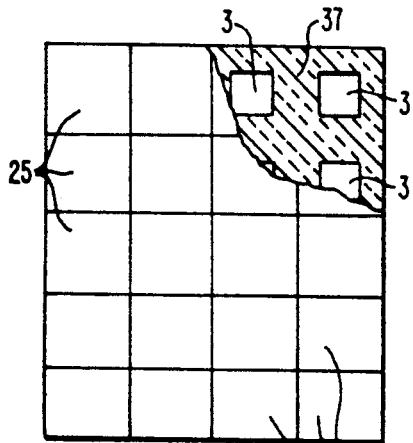
FIG. 3 is a bottom plan view of the temperature regulating system of FIG. 2 with a portion thereof taken in partial cross-section.

Referring to FIGS. 2 and 3, a plurality of regulators 1 are shown as being secured to roof 11 of storage room or enclosure 13 to regulate the temperature of the interior space 15 of enclosure 13. Interior space 15 is defined by the ceiling of roof 11, front wall 17, rear wall 19, side walls 21 (one of which is not shown in the view illustrated in FIG. 2) and base 23. To maintain temperature regulators 1 against and in direct contact with the ceiling of roof 11, support plate 25 is positioned underneath container 3 and secured to the ceiling via a connector assembly, such as connector assembly 27, which is shown as comprising a fastener or bolt 29 having one end secured to the ceiling by its head portion 31 and its other end secured to support plate 25 by nut 33. Connector assembly 27 or any part thereof can be selected to have a low thermal conductivity to minimize undesired heat transfer from the ceiling or surroundings to bolt 29 and into interior space 15. In addition, insulation 37 is provided on the bottom surface of roof 11 (i.e., on the ceiling of enclosure 13) between containers 3 to minimize heat transfer during the day from roof 11 directly into interior space 15. It should be understood that other arrangements can be used to thermally couple container 3 to the interior surface of roof 11 without departing from the scope of the invention. In any event, containers 3 should be tightly secured against the interior surface of roof 11 to provide the necessary thermal contact therebetween.

On the other hand, heat transfer from interior space 15 through temperature regulator 1 and through roof 11 to the surrounding night sky is desirable. Roof 11 itself must be highly conductive. Also, support plate 25 and ceiling 11 are selected to have a relatively high thermal conductivity to ensure maximum heat transfer between interior space 15 and thermal mass 5, and between thermal mass 5 and the surrounding night sky. Metal materials such as steel or aluminum are suitable. The thicker the metal and the higher the conductivity of the metal, the better the heat transfer efficiency of the roof or metal support plate. Thicker material provides a larger heat sink. It has been found that 16-gauge 0.062 inch) steel provides good heat transfer characteristics when the spaces between containers 3 are as far apart as 8 to 12 inches. However, 0.050 inch aluminum allows even greater spacing between containers due to the high thermal conductivity of aluminum.

It is important that the outer surface of roof 11 be highly emissive of infrared radiation to maximize the radiation of heat to the night sky. If desired, wind screens (not shown) can be added, because wind will have the effect of warming the roof at night when the radiation will reduce the temperature of the roof to below ambient and inhibit the cooling of the water mass. Aluminum and/or galvanized steel should be painted white if they are to be used as the roofing material. The white outer surface also provides optimal sunlight reflection during the day to minimize solar heat gain, and make the roof opaque to solar radiation.

It is preferred that container 3 be made from a material that is not as heat conductive as metal. Otherwise, heat from the surrounding area during the day would follow a path through roof 11 to the upper wall of container 3, then to the side walls of container 3, and then to interior space 15, thereby bypassing insulation 7 and thermal mass 5. To avoid the above-described thermal path, container 3 is selected from a group of materials that has a relatively low thermal conductivity. Plastic is one such material that provides the desired characteristics. In addition to having a relatively low thermal conductivity, i.e., about 1% that of medium carbon steel, the use of plastic facilitates manufacture of a container with flexible walls that can flex and not rupture when the water in the container freezes. To maximize the conduction of heat through the top wall of container 3, and to facilitate heat transfer from the thermal mass to the cool evening sky, the thickness of the top wall of container 3 is made as thin as possible without sacrificing the container's structural integrity. The bottom wall is also preferably thin to facilitate the transfer of heat within the structure to the thermal mass for dissipation to the night sky.

It is very difficult to fill a plastic container without trapping some air. If an air bubble lodges itself such that it is in the heat flow path, heat transfer efficiency decreases. Accordingly, temperature regulators 1, 101 and 201 are shaped or oriented so that air bubbles rise to a high corner of the container so as not to interfere with desired heat transfer. Referring to FIG. 1, roof 11 and temperature regulator 1 are positioned at an angle to the horizontal so that air bubble 39 moves to the upper corner of container 3, thereby preventing a thin layer of air, i.e., insulation, from developing adjacent to the upper wall of container 3. In this fashion, essentially the entire heat transfer area of the upper wall of container 3 is contacted by the water mass to facilitate heat transfer between the roof 11 and the water mass.

Figure 4:
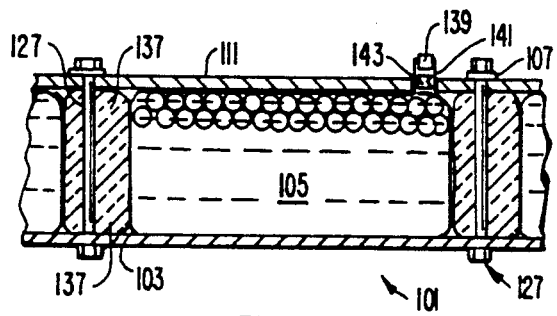
FIG. 4 is a sectional view of another embodiment of the temperature regulator.

FIG. 4 shows a modified form of the temperature regulator, wherein like reference numerals correspond to reference numerals of the embodiment of FIG. 1 incrementally increased by 100. Temperature regulator 101 is coupled to a shelter having a horizontal roof 111. Container 103 includes an extension or tubular section 141 that extends through hole 143 formed in horizontally disposed roof 111 (FIG. 4). Accordingly, container 103 can be manipulated before being mounted to the ceiling of roof 111 to ensure that air bubble 139 is captured in tubular section 141 and removed from the thermal path between the water and the upper wall of the container.

Figure 5:
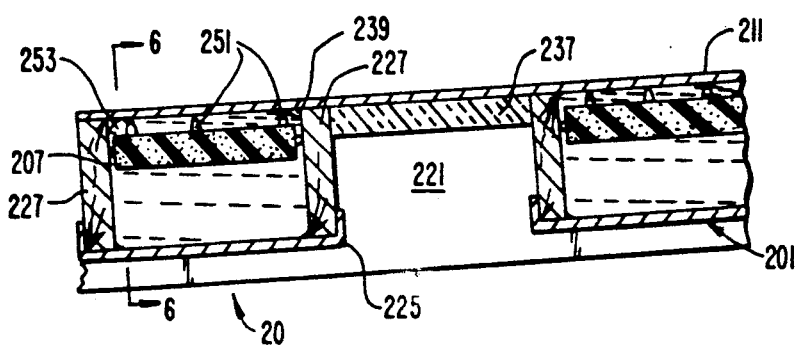
FIG. 5 is a sectional view of a further embodiment of the temperature regulator.
Figure 6:
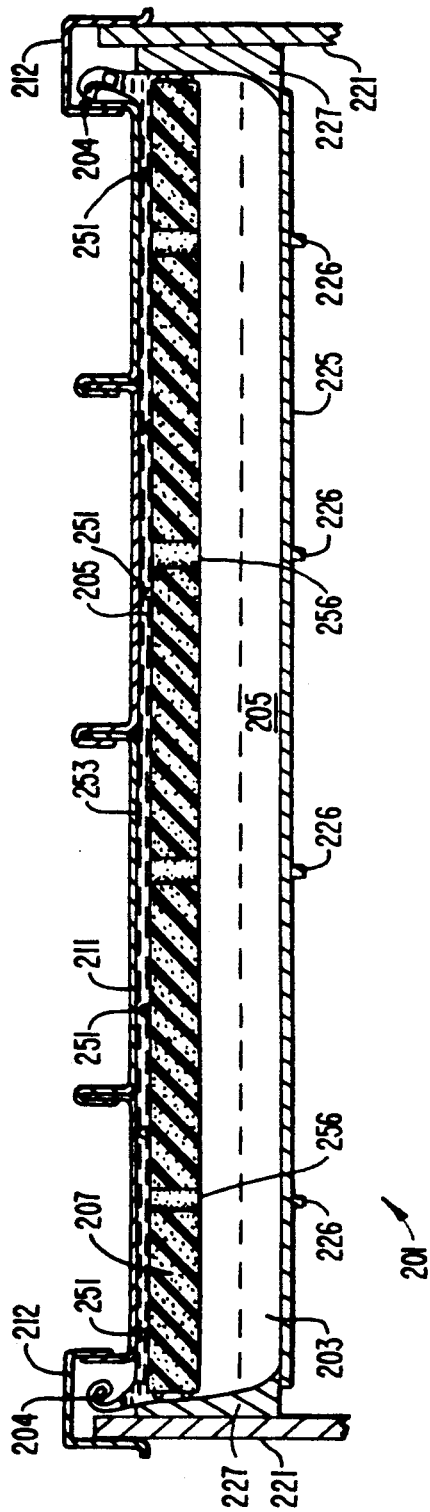
FIG. 6 is a sectional view taken along line 6—6 in FIG. 5.
Figure 7:
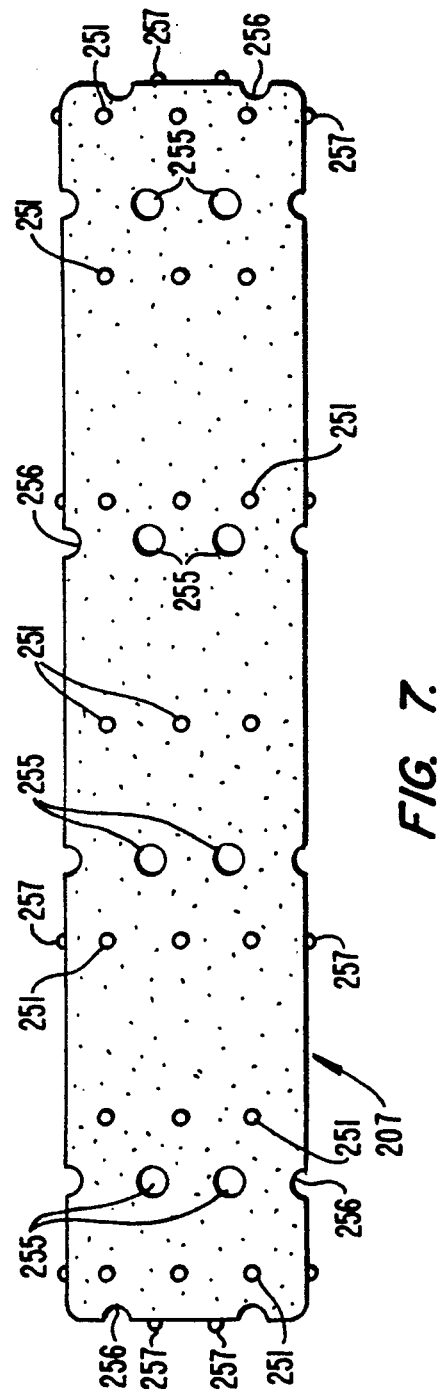
FIG. 7 is a top plan view of the insulation member illustrated in FIGS. 5 and 6.

FIGS. 5-7 show a further form of the temperature regulator, wherein like reference numerals correspond to reference numerals of the embodiment of FIG. 1 incrementally increased by 200. Temperature regulator 201 includes insulation 07 which is in the form of a sheet or slab. Accordingly, container 203 includes an opening that is sized to receive a sheet or slab of insulation. Container 203 can be in the form of conventional lay-flat tubing having openable ends 204. Such tubing can be made of polyethylene, for example, or other suitable plastic. A portion of each end 204 is rolled to seal water 205 and insulation 207 in container 203. The rolled ends are sealed in a way conventional to those skilled in the art. Thus, the terminal portions of ends 204 function as inlet/outlet ports so that container 203 can be filled or drained. Once container 203 is equipped with insulation 207 and water 205, the rolled ends of the lay-flat tubing are inserted through openings or slots formed in roof 211 such that the tubing, and thus container 203 can be pressed flush against the bottom surface or ceiling of roof 211. The rolled ends of the lay-flat tubing can be protected in a conventional manner. For example, caps 212 having a U-shaped channel configuration can be used to cover the rolled ends of the lay-flat tubing. Caps 212 can be secured to roof 211 in a way conventional to those skilled in the art.

Referring to FIGS. 5 and 6, support plate 225 supports container 203. Support Plate 225 is positioned to bear against the bottom surface of the container 203 and to exert sufficient force thereon to maintain the top surface of container 203 against and in direct contact with the bottom or interior surface of roof 211. Container 203 preferably is configured and sized to extend across the shelter to be cooled. Accordingly, transverse ridges 226 can be provided to extend across and thus strengthen the relatively long support span that forms support plate 225. Support plate 225 can be secured to joists 227 which form a part of the shelter structure in a way conventional to those skilled in the art. Further, support plate 225 can have a U-shaped channel configuration. In this way, support plate 225 forms a gutter or trough that can be oriented to drain any condensate or leakage from container 203, thereby preventing water damage to equipment, etc. stored within the enclosure or storage facility. In a way similar to the embodiment illustrated in FIG. 1, container 203 of temperature regulator 201 is oriented so that air bubbles, such as air bubble 239, rise to a high corner of container 203 so as not to interfere with desired heat transfer.

Referring to FIG. 7, insulation member 207 includes passages that permit the water in container 203 to flow from the region below insulation member 207 to the region between insulation member 207 and the inner surface of the upper wall of container 203. Specifically, vertical projections 251 are provided on the upper surface of insulation member 207 to form a space or gap 253 between insulation member 207 and the inner surface of the upper wall of lay-flat tubing 203. Otherwise, the buoyancy of insulation member 207 would cause its upper surface to come into contact with the upper wall of container 203, displace the water therebetween, and seriously impede heat transfer from the upper wall of container 203 to the thermal mass of the temperature regulator. Vertical passages, such as holes or openings 255 provided through the thickness of insulation member 207 facilitate flow between the region below insulation member 207 and space 253. Alternatively, grooves 256 formed in the perimetrical side surfaces of insulation member 207, lateral projections 257 extending laterally from the sides of insulation member 207, or equivalents thereof can be used to provide vertical flow.

The temperature regulating system operates by disposing heat during the night, slowly warming during the day, and then cooling again after sundown. It is important that the regulator gains a relatively small amount of heat during the day. Accordingly, the structure should be suitably insulated, such as with ceiling insulation 37. Alternatively, the amount of substance that makes up the thermal mass (i.e., the amount of water) should be selected to minimize heat build-up during the day. The amount of insulation and the amount of substance that makes up the thermal mass can be optimized to suitably prevent heat gain.

Since the operational principles are common to the various embodiments of the present invention, the operational characteristics will be described with reference to the form of the invention illustrated in FIGS. 5-7 for purposes of simplification.

During the day, sun striking the roof of the enclosure warms the upper portion of container 203 and the water in space 253, but the heat does not appreciably penetrate further into the thermal mass. Although insulation 207 is important in reducing heat gain in the thermal mass which is transferred to the interior space of the enclosure, the relatively short length of a day and the low diffusivity of water (diffusivity being inversely proportional to volumetric heat capacity) allow the system to work fairly well even if there is very little insulation present. The warm water in space 253 also will not flow downwardly due to its relatively low density. In sum, water is both a poor conductor and a great absorber of heat. For example, heat entering still water from above travels down very slowly, for example about 1/6 as rapidly as in a concrete slab.

During the night, the water in space 253 is cooled by convection and then conduction through the upper wall of container 203, conduction through the ceiling of roof 211 and radiation to the night sky. As heat from the water above the insulation is transferred through the container, ceiling of the enclosure, and to the night sky, the density of that water increases. The denser water flows downwardly, through holes 255 or grooves 256 formed in insulation member 207 or through the slots formed between projections 257 that laterally extend from insulation member 207. The falling cold water is replaced by warmer water rising through the above-described holes, grooves or slots to space 253 above insulation member 207. The cold water in the lower region of container 203 cools by radiation and convection the interior space of the shelter, which may contain, for example, heat-sensitive electronics or fiber optics.

This describes the behavior above 39° F., the temperature at which the water is most dense. As the temperature of the water falls below 39° F., the water expands and the water beneath the insulation will not be cooled by convection. However, when the temperature gradient ranges from 32° F. to 39° F., the denser water at 39° F. flows downwardly and displaces the 32 F water upwardly. In this way, the temperature regulating system protects the area within the storage facility from surrounding temperatures below 39° F. by operating essentially in reverse and heating the interior.

Thus, the temperature regulator provides a system for moderating temperature swings. It tends to cool to a temperature of about 39° F., but not below that temperature. If it is not desirable to cool the enclosure down to 39° F., water can be drained from the container until the water level is below insulation 207. A break in the thermosiphon circuit, and thus the cooling effect of the regulator results. This may be desirable during winter months when, for example, the enclosure constitutes a residential structure or a part thereof.

Obviously, the sizes and materials used to make up each temperature regulator may be selected from a wide variety of sizes and/or materials. Merely to exemplify a preferred makeup which has been found to produce the desired effects, the following example may be recited. The insulation comprises about 25% of the depth of the container. Preferably, the insulation forms about a 2-inch layer that floats on about 6 inches of water. In the embodiments using beads for insulation, the insulation preferably comprises hollow spheres of foamed plastic having an outer diameter of about 1 inch. In the embodiments using a sheet of insulation, space 253 between the insulation and the upper wall of the container is about ⅛ inch or 1% of the distance between the outermost vertical passages (holes 255, grooves 256, slots between projections 257), whichever is greater. Openings 255 should have a diameter of at least about ½ inch to avoid undesirable resistance to fluid flow. Alternatively, the sum of the cross-sectional areas of the vertical passages preferably is about 4% of the area of the insulation member's top surface that faces the interior surface of the upper wall of container 203. About 2% of the vertical passages are in the vicinity of one end portion of insulation 207 and about 2% of the vertical passages are in the vicinity of the opposite end portion of insulation 207. Insulation member 207 is about 10 feet by 2 feet.

The above is a detailed description of a particular embodiment of the invention. It is recognized that departures from the disclosed embodiment may be made within the scope of the invention and that obvious modifications will occur to persons skilled in the art. The full scope of the invention is set out in the claims that follow and their equivalents. Accordingly, the claims and specification should not be construed to unduly narrow the full scope of protection to which the invention is entitled.

What is claimed is:

1. A temperature regulator comprising:
   a container having an inner chamber and an upper wall adapted to be in thermal contact with the underside of the roof of a structure;
   a supply of water filling said chamber, said water being in contact with essentially the entire effective heat transfer area of said upper wall; and
   insulation disposed in said chamber and located adjacent to said upper wall, said insulation defining passages that allow the water to flow vertically through the insulation,
   whereby the radiation of heat from the roof into the night sky cools the water above the insulation and the remainder of the water is cooled by convection as relatively warmer water below the insulation circulates upwardly through the insulation and cooler water above the insulation circulates downwardly, and heat transfer to the interior of the structure is minimized during the day by the insulation and the thermal mass of the water.

2. The regulator of claim 1 wherein said container further includes a port for filling said container with said water.

3. The regulator of claim 2 wherein said port comprises a tubular section that extends outwardly from said upper wall such that gas bubbles can be entrapped therein and maintained away from the region between said insulation and said 4. The regulator of claim 1 wherein the upper wall of the container is inclined relative to horizontal so that the water is in contact with the upper wall throughout most of the heat transfer area of the upper wall.

5. The regulator of claim 1 wherein said insulation floats in said water such that said water suspends said insulation in close proximity to said upper wall of said container.

6. The regulator of claim 5 wherein said insulation comprises spheres of a heat insulative material.

7. The regulator of claim 6 wherein said spheres have an outer diameter of at least one inch.

8. The regulator of claim 6 wherein said spheres are foamed plastic.

9. The regulator of claim 6 wherein said spheres are hollow.

10. The regulator of claim 1 wherein said insulation comprises a sheet of foamed plastic having a top surface in close proximity to the upper wall of the container.

11. The regulator of claim 10 wherein said sheet of foamed plastic includes a plurality of projections that extend from said top surface and space the top surface of the sheet of foamed plastic from said upper wall of said container.

12. The regulator of claim 10 wherein said passages comprise a plurality of vertical passages extending the entire thickness of said sheet to allow the water to flow between the area above said insulation and the area below said insulation.

13. The regulator of claim 12 wherein said passages comprise a plurality of holes that are formed through said insulation.

14. The regulator of claim 12 wherein said sheet includes a plurality of projections that extend from its perimetrical side surface and space said sheet from said intermediate section of said container, said vertical passages comprising slots formed between said projections.

15. The regulator of claim 12 wherein the sum of the cross-sectional areas of said vertical passages is about four percent of the area defined by said top surface.

16. The regulator of claim 1 wherein the container includes sidewalls of a material which does not readily conduct heat to inhibit heat transfer vertically through the sidewalls of the container.

17. A passively cooled structure comprising:
an enclosure including a roof having an interior surface that defines the upper boundary of an interior space; and
at least one temperature regulator positioned in said enclosure, each said temperature regulator including: roof;
a container having an upper wall and an interior forming a chamber located beneath the interior surface of the
means for maintaining said upper wall of said container in thermal contact with the interior surface of the roof;
a supply of water substantially filling said chamber; and
insulation disposed in said chamber and positioned adjacent said upper wall, said insulation including a top surface facing the interior surface of said upper wall, the area of said top surface being approximately equal to the effective heat transfer area of the interior surface of said upper wall, said insulation defining passages that provide fluid flow vertically through said insulation,
whereby the radiation of heat from the roof into the night sky cools the water above the insulation and the remainder of the water is cooled by convection as relatively warmer water below the insulation circulates upwardly through the insulation and cooler water above the insulation circulates downwardly, heat transfer to the interior of the structure is minimized during the day by the insulation and the thermal mass of the water.

18. The system of claim 17 wherein the roof and the upper wall of said container are oriented at angle with respect to horizontal such that said container has an upper and lower corner, whereby gas trapped in said container rises to said upper corner of said container.

19. The system of claim 17 wherein said insulation comprises spheres of heat insulative material that are less dense than said water to the extent that they float in said water and are suspended in close proximity to the upper wall of the container.

20. The system of claim 17 wherein said insulation comprises a sheet of heat insulative material.

21. The system of claim 20 wherein said insulation floats in said water such that it is in close proximity to said upper wall of said container.

22. The system of claim 21 wherein said sheet of insulation includes a plurality of projections that extend from said top surface of said insulation toward said upper wall of said container and maintain said top surface of said floating insulation spaced from said upper wall of said container.

23. The system of claim 20 wherein said passages comprise a plurality of holes extending through the entire thickness of said sheet.

24. The system of claim 20 wherein at least a portion of the perimetrical side surface of said sheet of insulation is spaced from said intermediate section of said container.

25. The system of claim 17 wherein the upper surface of the roof is highly emissive to heat radiation.

26. The regulator of claim 17 wherein the container includes sidewalls of material which does not readily conduct heat to inhibit heat transfer vertically through the sidewalls of the container.

27. A temperature regulating system comprising:
an enclosure including a roof having an inner surface that defines the upper boundary of an interior space, said enclosure having an emissive outer surface exposed to the atmosphere; and
a plurality of temperature regulators disposed in said enclosure, each said temperature regulator including a container having an upper wall, a lower wall and an intermediate section, said upper wall, lower wall and intermediate section having interior surfaces forming a chamber, at least the intermediate section being constructed of a material which is a poor conductor of heat, and water substantially filling said chamber and being in contact with essentially the entire effective heat transfer area of said interior surface of said upper wall of said container;
means for maintaining the upper walls of the containers in thermal contact with the interior surface of the roof;
insulation disposed in each said chamber, positioned in close proximity to each said upper wall and dividing said chambers into an upper and a lower spaces, said insulation including an upper surface facing said upper wall, the area of said upper surface being approximately equal to the effective heat transfer area of the interior surface of said upper wall, said insulation defining passages that provide fluid flow communication between said upper and lower walls of said container,
whereby the radiation of heat from the roof into the night sky cools the water above the insulation and the water is cooled by convection as relatively warmer water below the insulation circulates upwardly through the insulation and colder water above the insulation circulates downwardly, and heat transfer to the interior of the structure is minimized during the day by the insulation and the thermal mass of the water.

28. The system of claim 27 wherein said insulation floats in said water with a buoyancy that maintains said insulation adjacent to said ceiling.

29. The system of claim 27 wherein the roof and the upper wall of said container are oriented at an angle with respect to horizontal such that said container has an upper and lower corner, whereby gas trapped in said container rises to said upper corner of said container.

30. The system of claim 27 wherein the upper surface of the roof is highly emissive to heat radiation.

* * * * *